(12) United States Patent
Alzner

(10) Patent No.: US 6,866,149 B2
(45) Date of Patent: Mar. 15, 2005

(54) BARRIER ENVELOPES FOR REUSABLE PHOTO-STIMULABLE PHOSPHOR IMAGING PLATES

(75) Inventor: Edgar Alzner, Garden City, NY (US)

(73) Assignee: Air Techniques, Inc., Hicksville, NY (US)

( * ) Notice: Subject to any disclaimer, the term of this patent is extended or adjusted under 35 U.S.C. 154(b) by 0 days.

(21) Appl. No.: 10/429,986

(22) Filed: May 6, 2003

(65) Prior Publication Data

US 2003/0209594 A1 Nov. 13, 2003

Related U.S. Application Data

(60) Provisional application No. 60/380,138, filed on May 7, 2002.

(51) Int. Cl.[7] .............................................. B65D 85/48
(52) U.S. Cl. .................. 206/455; 206/459.5; 383/201
(58) Field of Search ................. 206/307, 454, 206/455, 456, 484, 459.5; 229/80, 80.5; 383/201

(56) References Cited

U.S. PATENT DOCUMENTS

| | | | | |
|---|---|---|---|---|
| 4,238,541 A | * | 12/1980 | Burton | 428/43 |
| 4,834,241 A | * | 5/1989 | Southern | 206/459.5 |
| 4,834,245 A | * | 5/1989 | Ohga et al. | 383/201 |
| 4,937,040 A | * | 6/1990 | Holcomb et al. | 383/5 |
| 5,613,779 A | * | 3/1997 | Niwa | 383/201 |

* cited by examiner

*Primary Examiner*—David T. Fidei
(74) *Attorney, Agent, or Firm*—Louis E. Marn; Clifford G. Frayne

(57) ABSTRACT

A barrier envelope for reusable photo-stimulable phosphor imaging plates, particularly for digital dental imaging comprised of a plastic transparent film and a plastic opaque film sealed to each other about three sides thereof defining a chamber for an imaging plate and wherein a free side of each film is formed with a flap and one flap is coated with an adhesive medium protected by a peel strip and wherein a "Y" shaped notch is provided on a side of the barrier envelope adjacent to the free side of each film the barrier envelope to facilitate tearing open of the barrier envelope in a removal procedure and transport of an exposed imaging plate to an optical scanning assembly.

8 Claims, 2 Drawing Sheets

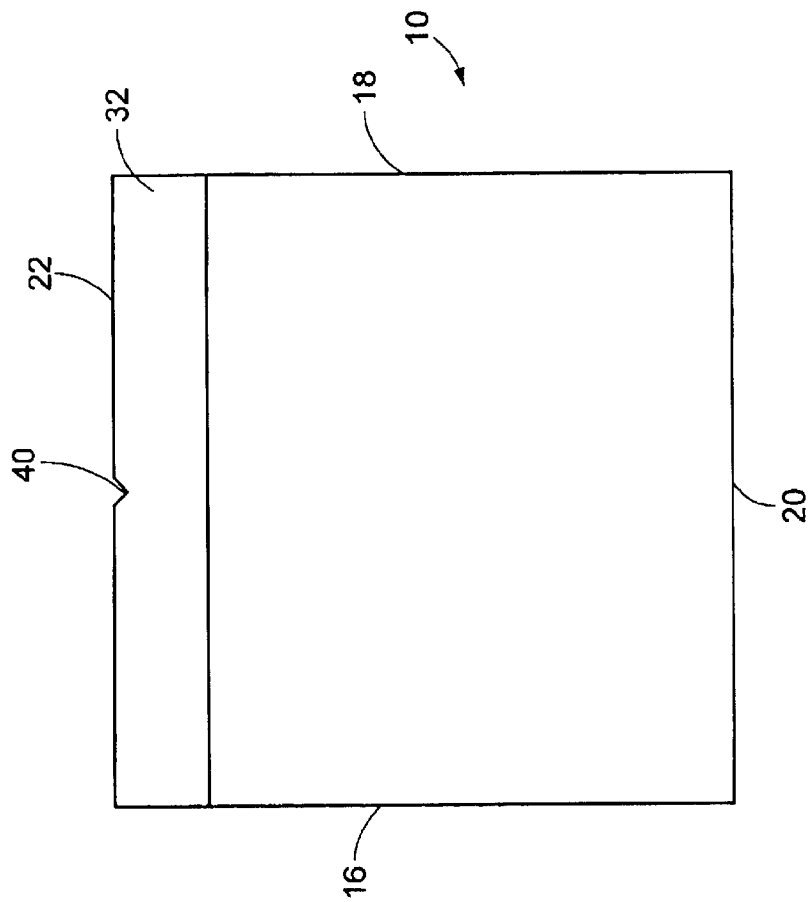
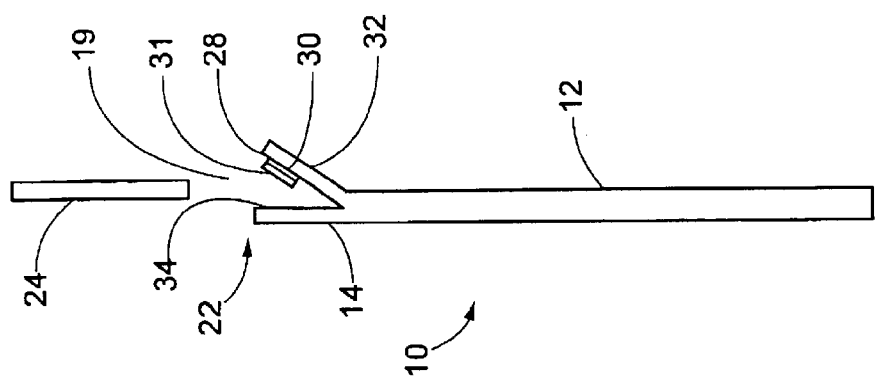
FIG. 2
PRIOR ART
FIG. 1
PRIOR ART

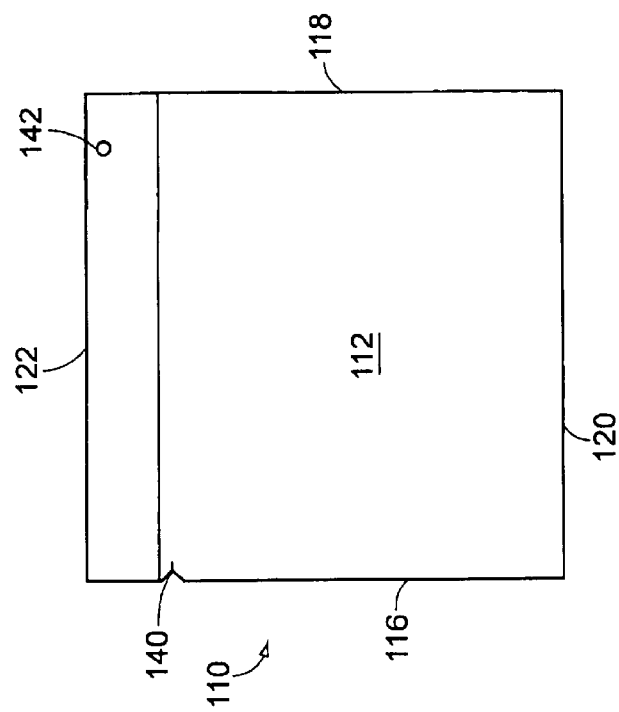
FIG. 4
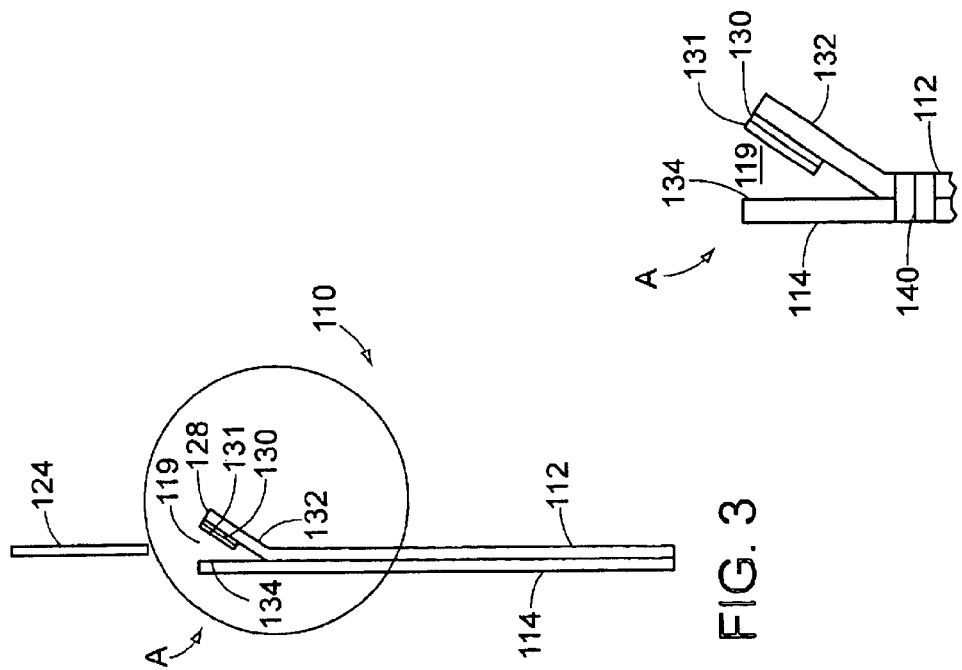
FIG. 5
FIG. 3

BARRIER ENVELOPES FOR REUSABLE PHOTO-STIMULABLE PHOSPHOR IMAGING PLATES

RELATED APPLICATIONS

Applicant claims the benefit of provisional application Ser. No. 60/380,138, filed May 7, 2002.

BACKGROUND OF THE INVENTION

1. Field of the Invention

The present invention relates to barrier envelopes which are used to enclose and protect reusable photo-stimulable phosphor imaging plates, such plates being particularly used in the dental operatory with digital dental imaging systems.

2. Description of the Prior Art

Modern digital dental imaging systems utilize reusable photostimulable phosphor (PSP) imaging plates as opposed to the traditional x-ray film. The photostimulable phosphor imaging plate is enclosed within a barrier envelope and then positioned within the patient's oral cavity where it is then exposed. It is then removed from the oral cavity and from the barrier envelope and positioned in a light proof chamber for transport to a scanner where the imaging plate is inserted and digitally read, the imaging results being stored on a central processing unit.

The patient needs to be protected against cross contamination since the imaging plate is reusable, and must also be protected from the toxicity of the imaging plate. Still further, the imaging plate needs to be protected from the saliva and other substances found in the patient's mouth, and the exposed x-ray imaging plate needs to be protected from light until it is scanned or read. The existing envelopes currently used in the art are basically a rectangular envelop sized to accommodate various sizes of reusable photo-stimulable phosphor imaging plates common to the dental arts (sizes 0 to 4). The rectangular envelope has a seal peel-strip across the short dimension of its rectangular shape. The imaging plates are inserted lengthwise into the envelopes and sealed into the envelope after the removal of the peel-strip across one of the short dimensions. After sealing, the sealed end consists of two layers of the envelope flaps and the double sided adhesive strip. This flap is also formed with a "V" notch in its center to arguably facilitate the tearing of the envelope in the lengthwise direction when removing the imaging plate from the envelope. The lengthwise direction facilitates the ejection of the imaging plate.

The "V" notch may have a finite radius at its point due to the way the tooling is constructed, or due to wear of the tooling in the manufacture of the envelope. The presence of this finite radius decreases the ease with which the user can initiate a tear of the envelope. Still further, many of the barrier envelopes used with respect to imaging plates are constructed of plastic and typically have a grain in one direction, making it easier to tear in one direction, as opposed to another. Existing envelopes as constructed, are available only with the grain in the direction orthogonal to the direction of the tear as defined by the location of the tear notch and therefore contribute to making the tear more difficult than necessary. As the difficulty in tearing increases, it makes ejection of the imaging medium less controlled and more care must be exercised to aim the ejected medium, i.e. imaging plate, into its receiving receptacle. When the imaging medium is a photo-stimulable phosphor imaging plate, one side of the barrier envelope was provided with a transparent plastic material, and the other side is made of a light shielding material. In the existing technology, dark blue or navy blue are the colors used to shield the light from the imaging side of the imaging plate.

Applicant's barrier envelope construction addresses the short comings of the prior art and provides for a barrier envelope of improved design and easier opening.

OBJECTS OF THE INVENTION

An object of the present invention is to provide for a novel barrier envelope for use with imaging medium which are easier to open.

A further object of the present invention is to provide for a novel barrier envelope for use with an imaging medium in which the opening tear of the barrier envelope is with the grain.

A still further object of the present invention is to provide for a novel barrier envelope in which the sealing flap is positioned along an edge and is not required to be breached in the tearing process.

A still further object of the present invention is to provide for a novel barrier envelope in which the opaque, light shielding side of the barrier envelope provides increased light blocking.

A still further object of the present invention is to position the opaque light blocking means on one side of the envelope on the inside of one of the envelope sides, while the outside of the same side is a distinctly light colored surface such as white or a pastel color to facilitate orienting such envelope with a plate in it correctly within the oval cavity.

A still further object of the invention is to provide an identification means as part of the envelope so that the plate orientation, as determined by the film bump equivalent identifies, such as a small circle or large dot at one corner of the plate, within the envelope relates to the envelope identifier, which is the corner created by the edge being sealed and the edge containing the "Y" notch, each of these envelope edges being wider than the remaining two pre-sealed and opposite edges.

SUMMARY OF THE INVENTION

A barrier envelope for use with an imaging medium, particularly adaptable to reusable photo-stimulable phosphor imaging plates for digital dental imaging systems, the barrier envelope being generally rectangular in shape, the barrier envelope comprising a first panel and a second panel secured to each other about three sides, one panel having an overlapping, self-adhesive flap means for permitting the introduction of the imaging medium into the envelope and sealing the edge of the envelope, the panels of the envelope fabricated with the grain running either longitudinally or laterally, there being at one lateral end of an envelope having longitudinal grain, a "Y" notch to facilitate the tearing of the envelope after exposure for removal of the imaging medium and in a second embodiment there being a "Y" notch on one longitudinal side proximate the self adhesive flap of an envelope having a lateral grain, one panel of the envelope having a black interior wall and white exterior wall, or a black wall on both surfaces, the opposing panel being transparent or translucent, the image medium being inserted into the envelope with the imaging side adjacent the black interior wall of the panel, and the wider "Y" notches lateral end and sealable longitudinal edge providing an envelope identification that relates to the dot or circle identification as an imaging plate.

BRIEF DESCRIPTION OF THE DRAWINGS

These and other objects of the present invention will become evident particularly when taken in light of the following illustrations wherein:

FIG. 1 is an end view of the existing configuration of barrier envelopes labeled prior art;

FIG. 2 is a front view of the barrier envelope of the prior art;

FIG. 3 is an end view of the barrier envelope of the present invention;

FIG. 4 is a front view of the barrier envelope of the present invention; and

FIG. 5 is a close up front view of area "A" of FIG. 3.

DETAILED DESCRIPTION OF THE DRAWINGS

FIG. 1 is an end view of a barrier envelope 10 of the prior art and FIG. 2 is a rear view of the barrier envelope 10 of the prior art. Barrier envelope 10 comprises a first panel 12 which is clear or translucent and a second panel 14 which is opaque. In the dental arts, the clear or translucent first panel is commonly referred to as the front side of the envelope and the opaque second panel is commonly referred to as the rear side. As illustrated in FIG. 2, first panel 12 and second panel 14 are secured about their opposing edges 16 and 18 and along one lateral edge 20. The opposing lateral edge 22 is not secured during a production of the barrier envelope 10. It is left open to form the slot 19 for the receipt of the imaging medium 24.

Referring again to FIG. 1, the lateral edge 22 is not secured during production, but that panel 12 has affixed on the interior surface 28 proximate lateral edge 22, an adhesive layer 30 overlaid with a release liner 31 extending the length of lateral edge 22. Once the imaging medium has been inserted into barrier envelope 10, the release liner 31 is removed and flap portion 32 of panel 12 having adhesive 30 positioned thereon is pressed against the inner surface 34 of panel member 14 to form a seal across lateral edge 22. The barrier envelope of the prior art is then ready for use within the patient's oral cavity.

Typically, the panel member 14 which is the opaque rear side is constructed of an opaque vinyl or similar material with either a black or a dark blue pigment. Panel 12 or translucent front side is constructed of a translucent vinyl or similar material. This aids the dental technician in properly orienting the barrier envelope and its contained imaging medium within the oral cavity.

There is formed along the lateral edge 22 of barrier envelope 10, a "V" notch 40 and both first panel member 12 and second panel member 14. "V" notch 40 is formed during the construction of the envelope to assist the dental technician in tearing the barrier envelope 10 open after the imaging medium has been exposed so that the imaging medium can be deposited in a lightless box or similar apparatus for transportation to a scanner or reader. The "V" notch 40 in the prior art envelopes is positioned on the lateral edge having the most thickness in that lateral edge 22 consists of the thickness of panel member 12 and panel member 14, as well as the layer of adhesive 30, and possibly also an adhesive carrier material, sealing the aforesaid panel members. Additionally, the grain of the vinyl material used to construct panel member 12 and panel member 14 runs perpendicular to the "V" notch 40 (from edge 16 to edge 18). Thus the tearing open and removal of the imaging medium from the barrier envelope 10 of the prior art is complicated by the fact that the starting point for the tear is at the thickest end, and since the "V" notch is formed prior to the sealing of the two flaps, there is the possibility that the vertex of the "V" notch of the two flaps after sealing do not exactly align; lateral edge 22 of the barrier envelope 10 and the tear is designed to proceed perpendicular to the grain as opposed to with the grain. The additional problem exists with respect to the "V" notch 40 itself. In theory it is designed to be a well defined "V" notch of 60 to 90 degrees. In practice because of manufacturing problems, the "V" notch does not end with a well defined point, but rather, a finite radius which does not lend itself to a crisp well-defined tear of the envelope for removal of the imaging medium.

FIG. 3 is an end view of a barrier envelope 110 of the present invention and FIG. 4 is a rear view of the barrier envelope 110 of the present invention. Barrier envelope 110 comprises a first panel 112, which is clear or transparent, and a second panel 114, which is opaque. In the dental arts, the clear or transparent first panel 112 is commonly referred to as the front side of the envelope and the opaque second panel 114 is commonly referred to as the rear side. As illustrated in FIGS. 3 and 4, the first panel 112 and the second panel 114 are secured about their opposing edges 116 and 118 and along one longitudinal edge 120. The opposing longitudinal edge 122 is not secure during the production of the barrier envelope 110. It is left open to form the slot 119 for the receipt of the imaging medium 124.

Referring again to FIG. 3, the lateral edge 122 is not secured during production and second panel 114 has affixed on the interior surface 128, proximate to the lateral edge 122 an adhesive layer 130 overlaid with a release liner 131 extending the length of the longitudinal edge 122. Once the imaging medium has been inserted into the barrier envelope 110, the release liner 131 is removed and flap portion 132 of panel 112 having adhesive 130 positioned thereon is pressed against the inner surface 134 of panel member 114 to form a seal across longitudinal edge 122. The barrier envelope is then ready for use within the patient's oral cavity.

Typically, the panel member 114, which is the opaque rear side, is constructed of an opaque vinyl or similar material. Panel 112, or translucent front side, is constructed of a translucent vinyl or similar material. This aids the dental technician in orienting the barrier envelope and its contained imaging medium within the oral cavity.

The opaque side of the envelope can be a single color throughout, such as black, or it can be of a dual color being black on the inside and white, or a light pastel color, on the outside, the white side exterior providing a superior means which aids the dental technician in orienting the barrier envelope and its contained imaging medium in the oral cavity, and also because this identification more analogously matches the techniques used by dental technicians when using the previous film technology.

Barrier envelope 110 also is formed with a notch to facilitate the opening of the barrier envelope 110 for the removal of the imaging medium. Barrier envelope 110 is formed with a "Y" notch 140 in both panel member 112 and panel member 114. The "Y" notch 140 is formed during the construction of the envelope to assist the dental technician in tearing the barrier envelope 110 open after the imaging medium has been exposed. The "Y" notch 140 eliminates the unpredictability of the "V" notch 40 of the prior art as the leg of the "Y" notch 140 serves as the commencement of the tear, and the "Y" notch in the two panel members are necessarily aligned due to the construction of the envelope. Still further, with respect to barrier envelope 110, the "Y" notch 140 would not be positioned on the edge 122 where the barrier envelope thickness is greatest. Preferably the "Y" notch 140 would be formed on one of the edges 116 or 118 just below the demarcation line of flap 132 such that the tear could run with the grain (from edge 116 to edge 118) of the vinyl film. Also the "Y" notch is positioned in the specific edge so that this edge and the sealable longitudinal edge create the envelope identifier that corresponds to the imaging plate.

In one embodiment of the barrier envelope 110 of the present invention, panel 114 would be constructed of an opaque black material and second panel 112 would be constructed of a translucent vinyl material. In a second embodiment, the outer surface of panel 114 would be of a light color, white being the lightest, and the inner surface of panel 114 would be of a black opaque color or layer. The black color or pigmentation provides better light shielding than does the blue color or pigmentation currently being used.

An additional identifier may also be incorporated into barrier envelope 110 to further aid the dental technician in orienting the envelope and image medium. This would be in the form of a small aperture 142 or alternatively a slight bump in one of the upper hand corners thereof.

FIG. 5 is a close up view of area A, the flap area of FIG. 3.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed:

1. An improved barrier envelope for a reusable imaging plate, which comprises:

a transparent plastic film;

an opaque plastic film heat sealed to said transparent plastic film about a left side portion, a right side portion and a bottom portion thereby defining a chamber for said imaging plate, said films having an axial grain orientation parallel to a heat sealed seam and said bottom portion, a free side of one of said films provided with an adhesive coating wherein contact between said adhesive coating on said free side of one of said film with a free side of a cooperating film defines a seal line for hermetically sealing said chamber of said barrier envelope and a side portion of said barrier envelope provided with a "Y" shaped notch including an excise portion in alignment with said axial grain orientation of said films, said improved barrier envelope having a tactile indicia formed on said opaque or transparent film above said seal line to aid in orienting said improved barrier envelope and said imaging plate.

2. The improved barrier envelope as defined in claim 1 wherein said adhesive coating is provided proximate a top of said transparent plastic film.

3. The improved barrier envelope as defined in claim 1 wherein said adhesive coating is overlaid with a peel strip.

4. The improved barrier envelope as defined in claim 1 wherein said "Y"-shaped notch is provided on said right side portion of said barrier envelope.

5. The improved barrier envelope as defined in claim 4 wherein said "Y"-shaped notch is perpendicularly disposed to said heat seal of said right side portion at a point below said seal line.

6. The improved barrier envelope as defined in claim 1 wherein a linear dimension between the heat seal of said right side portion and an edge thereof is greater than a linear dimension between the heat seal of said left side portion and on edge thereof.

7. The improved barrier envelope as defined in claim 5 wherein a linear dimension between the heat seal of said right side portion and an edge thereof is greater than a linear dimension between the heat seal of said left side portion and on edge thereof.

8. The improved barrier envelope as defined in claim 1 wherein said opaque plastic film is impervious to active electromagnetic radiation.

* * * * *